US012407967B2

(12) United States Patent
Zhang

(10) Patent No.: US 12,407,967 B2
(45) Date of Patent: Sep. 2, 2025

(54) MICROPHONE

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 226 days.

(21) Appl. No.: 18/323,391

(22) Filed: May 24, 2023

(65) Prior Publication Data

US 2024/0155279 A1 May 9, 2024

Related U.S. Application Data

(63) Continuation of application No. PCT/CN2023/080307, filed on Mar. 8, 2023.

(30) Foreign Application Priority Data

Nov. 7, 2022 (CN) ......................... 202222970739.8

(51) Int. Cl.
*H04R 1/04* (2006.01)

(52) U.S. Cl.
CPC ........... *H04R 1/04* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 11,109,134 | B2 * | 8/2021 | Riemann .................. | H04R 1/08 |
| 2007/0058821 | A1 * | 3/2007 | Welsh ..................... | H04R 3/005 381/91 |
| 2016/0234594 | A1 * | 8/2016 | Ogura ................. | B60R 11/0247 |
| 2020/0280782 | A1 * | 9/2020 | Kleinheincz ........... | H04R 1/086 |

* cited by examiner

*Primary Examiner* — Paul W Huber
(74) *Attorney, Agent, or Firm* — Wiersch Law Group

(57) ABSTRACT

A microphone is provided. The microphone includes a housing having an accommodating cavity, a circuit board fixed to the accommodating cavity, an interface assembly fixed to an outer side of the housing and electrically connected to the circuit board, and a microphone unit fixed to the circuit board. The housing includes a shell having the accommodating cavity and a cover plate fixed to the housing and covering the accommodating cavity, the interface assembly is fixed to one side of the shell away from the cover plate, an insertion direction of the interface assembly is perpendicular to a surface of the circuit board. The microphone cancels the weak connecting plate, which can enhance the connection strength between interface assembly and the housing, which is conducive to miniaturizing the microphone and allowing it to flexibly adapt to different installation methods.

6 Claims, 4 Drawing Sheets

A-A

MICROPHONE

TECHNICAL FIELD

The present disclosure relates to a technical field of microphone technology, in particular to a microphone applied in vehicle entertainment system.

BACKGROUND

Vehicles each generally has a vehicle-mounted entertainment system with functions such as radio, video playback, and karaoke, for the karaoke function, according to habits of people, microphones are an essential device among. Referring to FIG. 1, a microphone typically includes a housing 10 having an accommodating cavity and a circuit board fixed in the accommodating cavity.

In related technologies, in order to achieve interaction between the microphone and the vehicle-mounted entertainment system, an interface assembly 20 is usually disposed on the microphone, a connector of the vehicle-mounted entertainment system is plugged into the interface assembly 20 to achieve connection between the vehicle-mounted entertainment system and the microphone. The interface assembly 20 is fixed on the housing 10 through a connecting plate 30, and the interface assembly 20 is disposed at one end of the connecting plate 30 away from the circuit board, so that there is a certain distance between the interface assembly 20 and the housing 10; an insertion direction of the interface assembly 20 is parallel to an extension direction of a surface of the circuit board, which makes the connecting plate 30 prone to breakage due to strong pulling during an insertion process between the connector and the interface assembly 20, thereby resulting in damage to the microphone.

Therefore, it is necessary to provide a new microphone.

SUMMARY

The present disclosure aims to provide a microphone applied in vehicle entertainment system to solve a problem that a connecting plate of the microphone is easily broken when the microphone is inserted into a connector in related technologies.

The technical solutions of the present disclosure are as follows.

The present disclosure provides a microphone, the microphone includes a housing having an accommodating cavity, a circuit board fixed to the accommodating cavity, an interface assembly fixed to an outer side of the housing and electrically connected to the circuit board, and a microphone unit fixed to the circuit board. The housing includes a shell having the accommodating cavity and a cover plate fixed to the housing and covering the accommodating cavity, the interface assembly is fixed to one side of the shell away from the cover plate, an insertion direction of the interface assembly is perpendicular to a surface of the circuit board, and the shell defines a pickup channel for providing sound signals to the microphone unit.

Optionally, the interface assembly includes an interface socket fixed to the shell and having an inserting cavity, and a contact pin fixed to the inserting cavity, a length extension direction of the inserting cavity is perpendicular to the surface of the circuit board, and the contact pin is electrically connected to the circuit board.

Optionally, two ends of the interface socket are communicated to form the inserting cavity, the interface socket is connected to the shell to be a whole, and the contact pin is fixed to the shell.

Optionally, a component surface is formed at a first side of the circuit board where the microphone unit is disposed, and an acoustic surface is formed at a second side of the circuit board. The cover plate is disposed opposite to the component surface, and the cover plate is fixed to the shell. The pickup channel is disposed opposite to the acoustic surface, and the pickup channel is exposed to the acoustic surface.

Optionally, the cover plate is glued to the shell.

Optionally, the circuit board defines a first through hole communicating the component surface and the acoustic surface, the microphone unit covers a first end of the first through hole located at the component surface, and the pickup channel communicates with a second end of the first through hole located at the acoustic surface.

Optionally, the pickup channel includes a first channel formed by extending inward from a surface of the shell, and a second channel formed by bending from one end of the first channel away from the surface of the shell toward one side close to the acoustic surface and extending to an inner wall of the shell, and the second channel communicates with the first through hole.

Optionally, the microphone further includes a fixing component respectively fixed to the shell and one side of the circuit board having the acoustic surface, the fixing component defines a second through hole, and the second through hole communicates with the first through hole and the second channel.

Optionally, the shell includes a first surface and a second surface, the first surface is adjacent to the second surface, the first surface is disposed opposite to the acoustic surface, the interface assembly is disposed on the first surface, and the first channel forms a pickup hole on the surface of the shell.

The beneficial effects of the present disclosure are as following.

Since the interface assembly is directly fixed on the housing, compared to the related technologies where a connecting plate is set up to fix the interface assembly on the housing, the present disclosure cancels the weak connecting plate, which can enhance the connection strength between interface assembly and the housing, which is conducive to miniaturizing the microphone and allowing it to flexibly adapt to different installation methods; furthermore, the insertion direction of the interface assembly is perpendicular to the surface of the circuit board, so that there will be no pulling during insertion, which will loosen or even break between the interface assembly and the housing, thereby avoiding damage to the microphone.

DETAILED DESCRIPTION

The following is a further explanation of the present disclosure in conjunction with the accompanying drawings and implementation methods.

Figure 2:
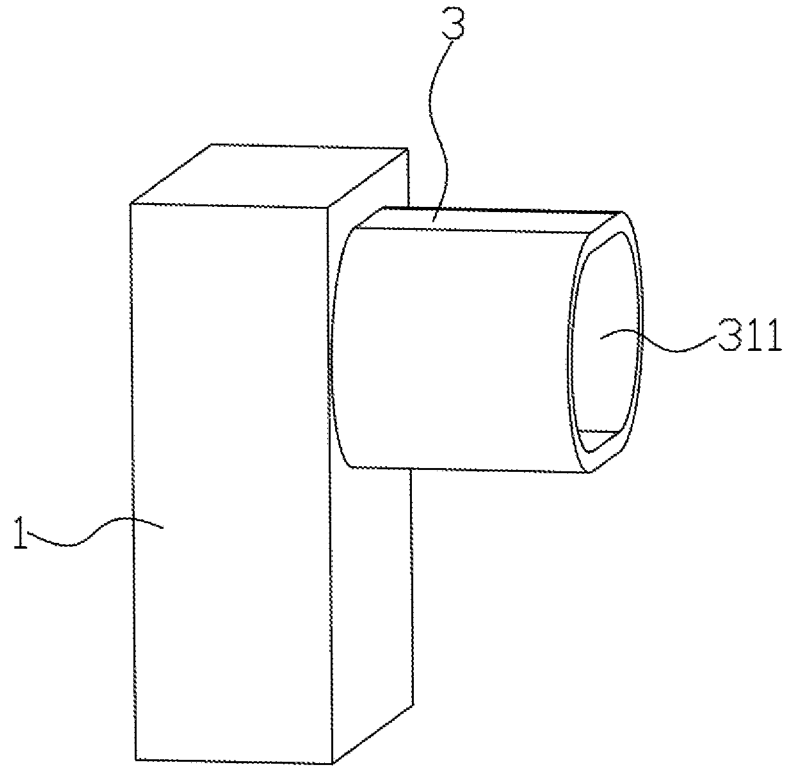
FIG. 2 is a schematic diagram of a microphone according to one embodiment of the present disclosure.
Figure 3:
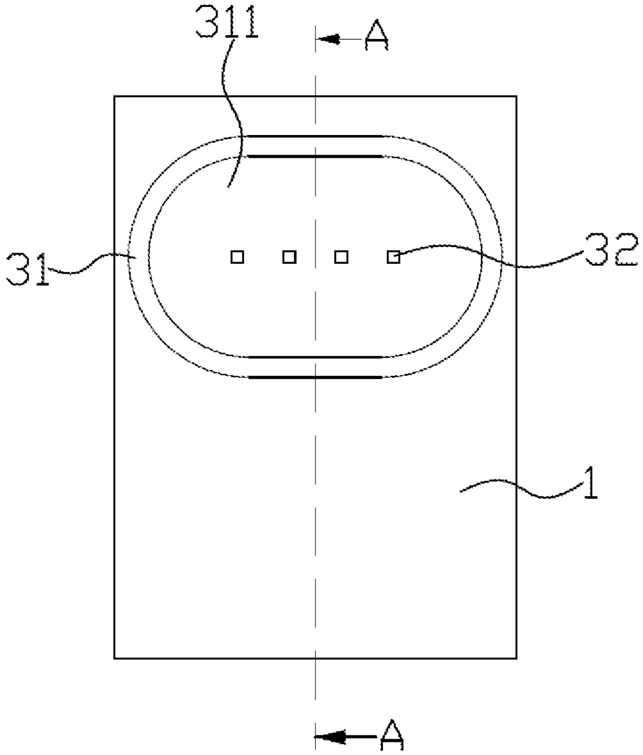
FIG. 3 is a schematic diagram of a right-side view of the microphone according to one embodiment of the present disclosure.
Figure 4:
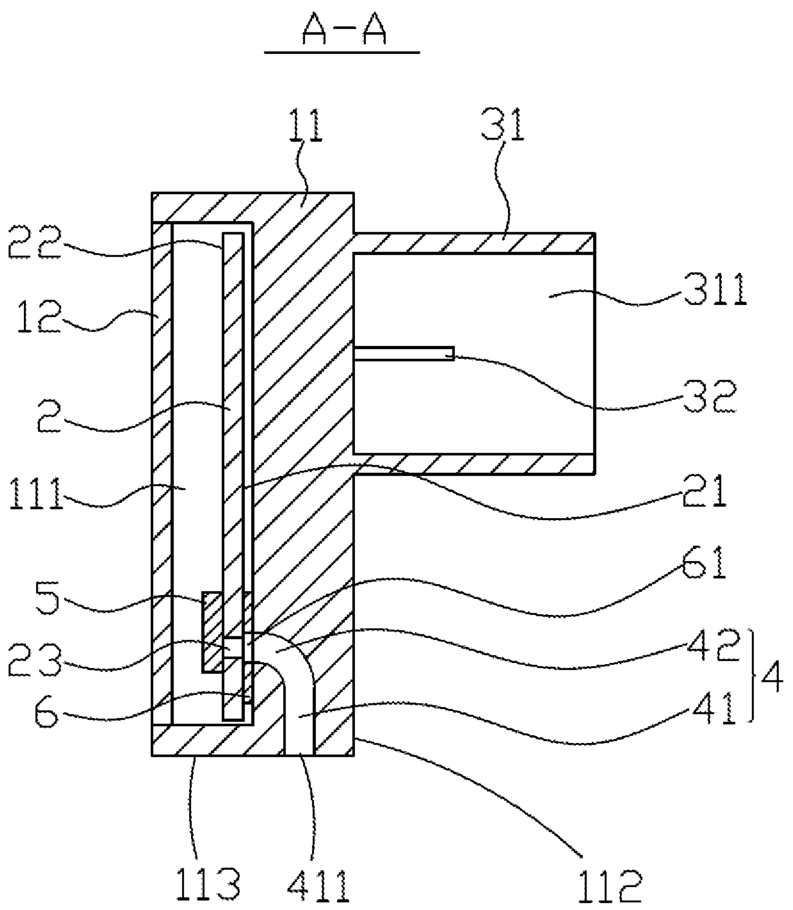
FIG. 4 is a schematic diagram of a cross-sectional view taken along the line A-A shown in FIG. 3.

Referring to FIGS. 2 to 4, A microphone includes a housing 1 having an accommodating cavity 111, a circuit board 2 fixed in the accommodating cavity 111, an interface assembly 3 fixed to the outer side of the housing 1 and electrically connected to the circuit board 2, and a microphone unit 5 fixed to the circuit board 2. The housing 1 includes a shell 11 having an accommodating cavity 111 and a cover plate 12 fixed to the shell 11 and covering the accommodating cavity 111, the interface assembly 3 is fixed to one side of the shell 11 away from cover plate 12, the insertion direction of the interface assembly 3 is perpendicular to a surface of the circuit board 2, and the shell 11 defines a pickup channel 4 for providing sound signals to the microphone unit 5.

Figure 1:
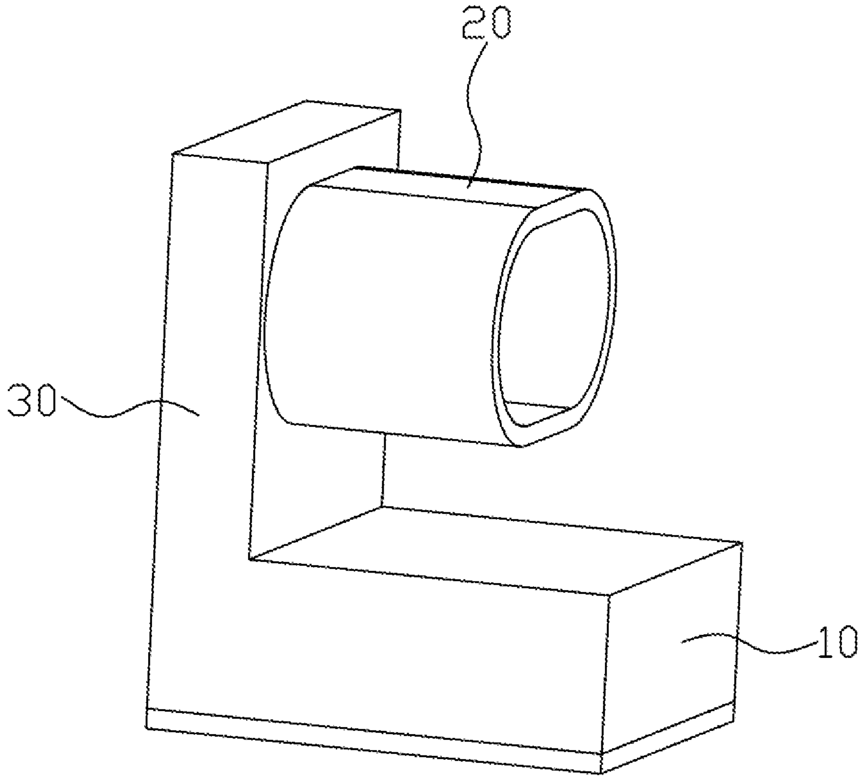
FIG. 1 is a schematic diagram of a microphone in related technologies.

Due to the fact that the interface assembly 3 is directly fixed on the housing 1, compared to the related technologies (as shown in FIG. 1) where a connecting plate 30 is set up to fix the interface assembly 20 on the housing 10, the present disclosure cancels the weak connecting plate 30, which can enhance the connection strength between interface assembly 3 and the housing 1, which is conducive to miniaturizing the microphone and allowing it to flexibly adapt to different installation methods; furthermore, the insertion direction of the interface assembly 3 is perpendicular to the surface of the circuit board 2, so that there will be no pulling during insertion, which will loosen or even break between the interface assembly 3 and the housing 1, thereby avoiding damage to the microphone.

Referring to FIGS. 2 to 4, furthermore, the interface assembly 3 includes an interface socket 31 fixed to the shell 11 and having an inserting cavity 311, and a contact pin 32 fixed to the inserting cavity 311, the length extension direction of the inserting cavity 311 is perpendicular to the surface of the circuit board 2, and the contact pin 32 is electrically connected to the circuit board 2. The connector is inserted into the inserting cavity 311 along the length extension direction of the inserting cavity 311, and the length extension direction of the inserting cavity 311 is perpendicular to the surface of the circuit board 2, allowing the connector to be inserted into the inserting cavity 311 along the direction perpendicular to the surface of the circuit board 2; after inserting the connector into the inserting cavity 311, the connector is connected to the contact pin 32, and the contact pin 32 is electrically connected to the circuit board 2, to achieve electrical connection between the terminal device and the microphone.

Referring to FIG. 2 and FIG. 4, in one embodiment, two ends of the interface socket 31 are communicated to form the inserting cavity 311, and the interface socket 31 is connected to the shell 11 to be a whole, and the contact pin 32 is fixed to the housing 1, making it easy to shape the microphone.

Referring to FIG. 4, furthermore, a component surface 22 is formed at a first side of the circuit board 2 where the microphone unit 5 is disposed, and an acoustic surface 21 is formed at a second side of the circuit board 2. The cover plate 12 is disposed opposite to the component surface 22, and the cover plate 12 is fixed to the shell 11. A pickup channel 4 is disposed opposite to the acoustic surface 21, and the pickup channel 4 is exposed to the acoustic surface 21. Specifically, the cover plate 12 is buckled and fixed to the shell 11, so that there is a gap at the connection between the cover plate 12 and the shell 11, from which water droplets or moisture can corrode the circuit board 2. Due to the sealed connection between the cover plate 12 and the shell 11, this gap can be sealed to prevent water droplets or moisture from corroding the circuit board 2, thereby avoiding the microphone from not working due to damage to the circuit board 2; meanwhile, due to the cover plate 12 is disposed opposite to the component surface 22, the pickup channel 4 is disposed opposite to the acoustic surface 21, it will not interfere with the normal use of the pickup channel 4.

Referring to FIGS. 2 to 4, in one embodiment, the cover plate 12 is glued to the shell 11, which means that there is a glue component located between the cover plate 12 and the shell 11, and the connection position between the cover plate 12 and the circuit board 2 is filled with the glue.

Referring to FIG. 4, furthermore, the shell 11 defines the pickup channel 4, a first end of the pickup channel 4 is exposed on the acoustic surface 21, and a second end of the pickup channel 4 is exposed outside of the shell 11, the pickup channel 4 can transmit the sound to achieve normal operation of the microphone.

Referring to FIG. 4, in one embodiment, the circuit board 2 defines a first through hole 23 communicating the component surface 22 and the acoustic surface 21, the microphone unit 5 covers a first end of the first through hole 23 located at the component surface 22, and the pickup channel 4 communicates with a second end of the first through hole 23 located at the acoustic surface 21. The sound signals can enter the microphone through the pickup channel 4 and enter the microphone unit 5 through the first through hole 23, the microphone unit 5 can convert the sound signals into electrical signals, and the terminal device receives the electrical signals through the connector to achieve the operation of the vehicle-mounted entertainment system.

Referring to FIG. 4, in one embodiment, the pickup channel 4 includes a first channel 41 formed by extending inward from the surface of the shell 11, and a second channel 42 formed by bending from one end of the first channel 41 away from the surface of the shell 11 toward the side close to the acoustic surface 21 and extending to the inner wall of the shell 11, and the second channel 42 communicates with the first through hole 23. The first channel 41 and the second channel 42 are connected in a 7-shaped shape.

Referring to FIG. 4, in one embodiment, the microphone further includes a fixing component 6 fixed to the shell 11 and one side of the circuit board 2 having the acoustic surface 21, respectively. The fixing component 6 defines a second through hole 61, the second through hole 61 communicates with the first through hole 23 and the second channel 42, respectively. Specifically, the fixing component 6 may be a fixing plate, and the fixing component 6 fixes the circuit board 2 to the inner wall of the shell 11; the fixing component 6 seals one end of the second channel 42 away from the first channel 41, so that the sound signals can only propagate from the second through hole 61 to the first through hole 23, thereby ensuring the integrity of the sound signals received by the microphone unit 5. In one embodiment, a size of the second through hole 61 is equal to a size of the second channel 42, and the size of the second through hole 61 is greater than a size of the first through hole 23, which can avoid sound leakage and further ensure the integrity of the sound signals received by the microphone unit 5.

Referring to FIG. 4, in one embodiment, the shell 11 includes a first surface 112 and a second surface 113, and the first surface 112 is adjacent to the second surface 113. The first surface 112 and the acoustic surface 21 are oppositely disposed. The interface assembly 3 is disposed on the first surface 112, the first channel 41 forms a pickup hole 411 on the second surface 113 of the shell 11, thereby providing a certain distance between the interface socket 31 and the pickup hole 411, after the connector is inserted into the interface socket 31, and when the microphone is held, it will not interfere with the sound signals received by the pickup hole 411.

The above description is merely embodiment of the present disclosure, and is not therefore intended to limit patent scopes of the present disclosure, and any equivalent structure or equivalent process transformation made by using the specification and drawings of the present disclosure, or directly or indirectly applied to other related technical fields, is included within the patent scopes of the present disclosure.

What is claimed is:

1. A microphone comprising:

a housing comprising an accommodating cavity;

a circuit board fixed in the accommodating cavity;

an interface assembly fixed to an outer side of the housing and electrically connected to the circuit board; and a microphone unit fixed to the circuit board;

wherein the housing comprises a shell having the accommodating cavity and a cover plate fixed to the housing and covering the accommodating cavity, the interface assembly is fixed to one side of the shell away from the cover plate, an insertion direction of the interface assembly is perpendicular to a surface of the circuit board, and the shell defines a pickup channel for providing sound signals to the microphone unit;

a component surface is formed at a first side of the circuit board where the microphone unit is disposed, and an acoustic surface is formed at a second side of the circuit board; the cover plate is disposed opposite to the component surface, and the cover plate is fixed to the shell; the pickup channel is disposed opposite to the acoustic surface, and the pickup channel is exposed to the acoustic surface;

the circuit board defines a first through hole communicating the component surface and the acoustic surface, the microphone unit covers a first end of the first through hole located at the component surface, and the pickup channel communicates with a second end of the first through hole located at the acoustic surface;

the pickup channel comprises a first channel formed by extending inward from a surface of the shell, and a second channel formed by bending from one end of the first channel away from the surface of the shell toward one side close to the acoustic surface and extending to an inner wall of the shell, and the second channel communicates with the first through hole.

2. The microphone according to claim 1, wherein the interface assembly comprises an interface socket fixed to the shell and having an inserting cavity, and a contact pin fixed to the inserting cavity, a length extension direction of the inserting cavity is perpendicular to the surface of the circuit board, and the contact pin is electrically connected to the circuit board.

3. The microphone according to claim 2, wherein two ends of the interface socket are communicated to form the inserting cavity, the interface socket is connected to the shell to be a whole, and the contact pin is fixed to the shell.

4. The microphone according to claim 1, wherein the cover plate is glued to the shell.

5. The microphone according to claim 1, wherein the microphone further comprises a fixing component respectively fixed to the shell and one side of the circuit board having the acoustic surface, the fixing component defines a second through hole, and the second through hole communicates with the first through hole and the second channel.

6. The microphone according to claim 1, wherein the shell comprises a first surface and a second surface, the first surface is adjacent to the second surface, the first surface is disposed opposite to the acoustic surface, the interface assembly is disposed on the first surface, and the first channel forms a pickup hole on the surface of the shell.

* * * * *